July 9, 1946.  W. A. GEOHEGAN ET AL  2,403,653
SHOULDER HARNESS TAKE-UP AND INERTIA LOCK
Filed April 5, 1944  2 Sheets-Sheet 1

INVENTORS
WILLIAM A. GEOHEGAN
RAYMOND E. PHIPPS
BY
ATTORNEYS

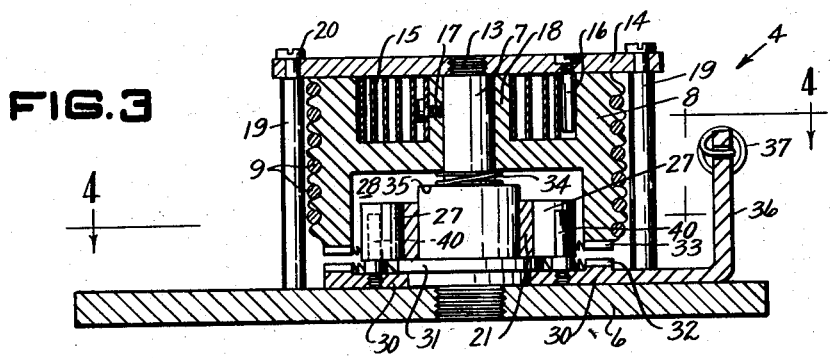
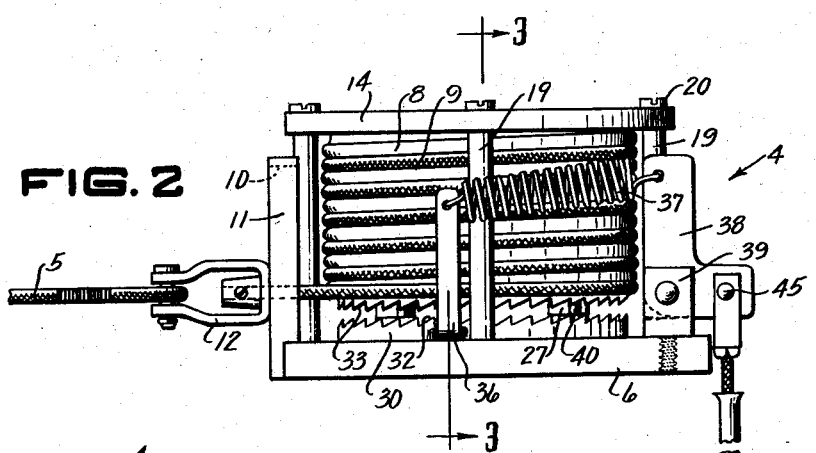
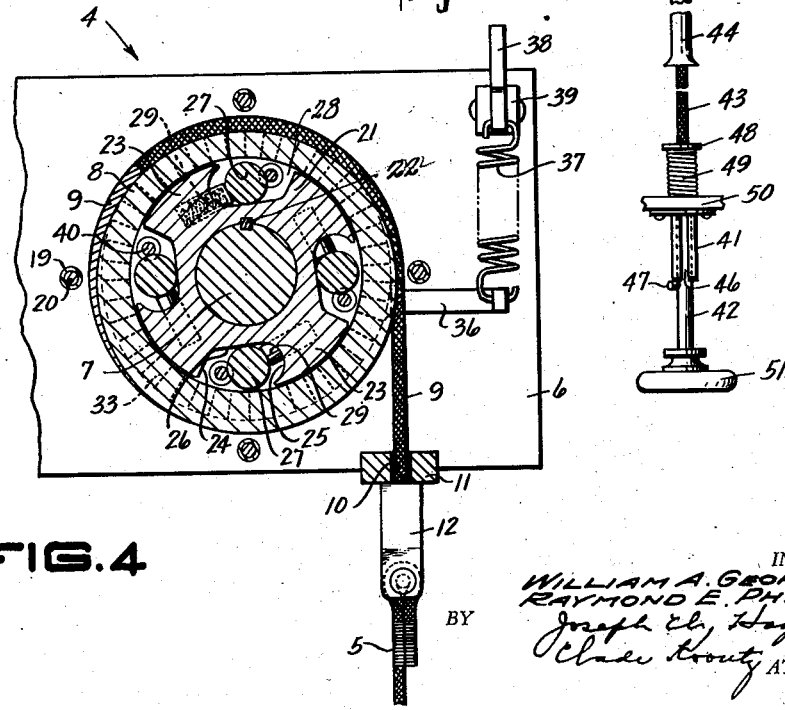

Patented July 9, 1946

2,403,653

UNITED STATES PATENT OFFICE 2,403,653

SHOULDER HARNESS TAKE-UP AND INERTIA LOCK

William A. Geohegan, Flushing, and Raymond E. Phipps, Baldwin, N. Y., assignors to the United States of America, as represented by the Secretary of War Application April 5, 1944, Serial No. 529,696

9 Claims. (Cl. 155—189)

1

This invention relates to improvements in yieldable pilot seat harness control apparatus for use with air planes and other fast moving crafts to prevent the pilot from being thrown forward from his seat against the instrument panel or other structure of the craft due to excessive deceleration of the same caused by a crash or forced landing on rough terrain, and has for an object the provision of inertia operated control means for preventing yielding action of the pilot seat harness during the excessive deceleration of the craft.

A further object of the invention is the provision of yieldable pilot seat harness retrieving means, and cooperating inertia operated locking means for the retrieving means operable by predetermined deceleration of the craft carrying the pilot seat to lock said retrieving means to prevent the yielding action thereof and relative forward movement of the pilot with respect to the craft during the deceleration of the craft.

A still further object is the provision of tensioned pilot shoulder harness takeup means normally operable to allow substantially free slacking and takeup movements of the takeup means to permit corresponding substantially free forward and rearward movements of the pilot in his seat, and an inertia operated locking device for said harness takeup means, operable upon predetermined substantially longitudinal deceleration of the craft carrying the pilot to lock said harness takeup means against harness slacking movement to prevent forward movement of the pilot.

A still further object is the provision of a spring tensioned takeup reel for the pilot harness normally operable to permit the pilot to move substantially freely forwardly and backwardly in the pilot seat, including automatically operable locking means for locking said reel to prevent rotative movement thereof incident to relative forward movement of the pilot with respect to the pilot seat during a predetermined deceleration of the craft carrying the pilot seat.

A still further object is the provision of a pilot harness takeup reel having rotary movement in opposite directions, and axial movement, and locking means for arresting rotary movement of the reel in one direction operable incident to combined axial movement, and slight rotary movement of the reel in the last mentioned direction.

Another object of the invention is the provision of inertia operated pilot harness restraining means for resiliently tensioning the pilot harness takeup means including locking means comprising an inertia operated member having a weight mounted for longitudinal movement relative to the direction of movement of the craft carrying the harness, having an operating connection between the locking means and the weight to cause locking movement incident to relative movement of the weight due to deceleration of the craft in excess of a predetermined deceleration.

Other objects and advantages of the invention will become apparent from the following description taken in connection with the accompanying drawings, in which like reference characters refer to like parts on the several figures.

Fig. 2 is an enlarged side elevation of the harness retrieving and locking means disclosed in Fig. 1, shown detached from the pilot seat.

Fig. 3 is a cross sectional view taken approximately on a plane indicated by the line 3—3 in Fig. 2.

Fig. 4 is a fragmentary cross sectional view taken approximately one a plane indicated by the line 4—4 in Fig. 3.

Figure 1:
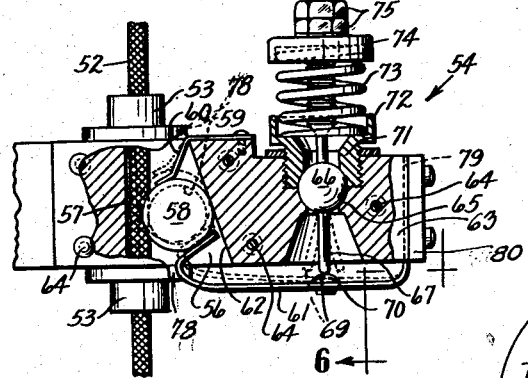
Fig. 1 is a perspective view of a pilot seat for an airplane or other fast moving craft having my improved inertia operated shoulder harness retrieving and locking means applied thereto.

Referring to Fig. 1, the reference numeral 1 indicates a pilot seat or chair fixedly secured in a suitable mobile support or craft, such as an airplane, which is subject to deceleration or abrupt stoppage as in the instance of a crash or emergency landing on rough terrain. The pilot seat is provided with a suitable safety harness, as indicated at 2, for yieldably retaining the pilot in the seat to prevent him from being thrown forward against the instrument panel or other rigid structure of the craft carrying the seat when the excessive deceleration just referred to occurs. The front end portion of the harness is preferably fixedly secured to the chair at either side, as indicated at 3, and passes over the shoulders of the pilot and back of the seat, and is secured to the yieldable tensioning means indicated generally at 4 by a suitable cable or other connecting member 5.

The tensioning means 4 comprises a base plate 6 secured to the back of the pilot's chair in a substantially vertical position. The base plate 6 has fixedly secured therein a main shaft or post 7 on which is freely rotatable an axially slidable cable takeup reel 8, having a cable 9 wound thereon with one end secured to the periphery of the cable reel. The other end of the cable 9 passes through a guide opening 10 in a guide plate 11 secured to the base plate 6. The end of the cable is provided with a U-shaped clip 12 to which is secured the end of the connector 5, which is secured to the other end portion of the shoulder harness 2. The post 7 is threaded at its outer extremity as indicated at 13 and has a disc or plate member 14 screwed onto the end thereof to retain the reel on the post, and acts as an anchor or "dead end" connection for the reel tensioning or winding spring 15. The plate 14 carries a screw pin 16, to which the outer coil of the spring 15 is secured, while the inner coil of the spring is fastened to the winding reel 8 by a short stud or screw member 17 projecting from the inner or sleeve portion 18 of the spring barrel of the reel 8. This spring 15 is initially wound to maintain a yielding tension on the winding cable 9 and the connection 5 to the shoulder harness 2 so that upon forward movement of the pilot in his seat the cable connections 5 and 9 will permit a substantially free forward movement of the pilot, and upon rearward movement, the winding drum 8 serves to take up any slack in the harness 2 and cables 5 and 9 and maintains the harness in contact with the pilot's shoulders at all times.

Suitable spacer tubes 19 and bolts 20 secure the top plate 14 at its edges to the base plate 6, and prevent relative rotation of the plate by the reel tensioning spring 15. The post 7 carries a camming spider 21 keyed or otherwise fixed thereto, as indicated at 22, and best observed in Fig. 4 of the drawings. This camming spider 21 comprises four lateral arms 23, each having an abrupt shoulder 24 at one side of the arm and a curved shoulder 25 at the other side, and a camming surface 26 extending outwardly from each curved shoulder on one of the arms to the abrupt shoulder on the adjacent arm.

Camming rolls 27 are positioned in the annular clutch chamber 28 of the reel 8 between the arms 23, and spring actuated plunger members 29 project from each of the arms 23 outwardly beyond the curved surfaces 25 thereof to engage behind the rolls 27, resiliently urging the rolls toward the outwardly inclined camming portions 26 and toward the inner annular surface of the clutch chamber 28. This structure provides a one-way pilot harness retrieving device in which the harness cable 5, when the pilot moves back against the pilot seat, is retrieved, due to the tension on the spring 15, winding up any slack occurring in the harness or cable. Subsequent forward movement of the pilot is, however, prevented, since the spring plungers 29 force the rolls 27 toward the narrow ends of the openings between the arms, causing the rolls 27 to wedge between the higher portions of the camming surfaces 26 on the spider 21 and the inner annular wall of the clutch chamber 28, locking the reel against further withdrawal of the harness tensioning cable 9 therefrom.

Means are provided for moving the rolls to a neutral or disengaging position, including inertia control means for automatically effecting jamming engagement of the rolls 27 with the reel 8 upon relative changes in directional movement of the base 6, particularly due to a deceleration in the movement of the base in a direction substantially parallel to the axis of the post 7.

The post 7 carries freely rotatable thereon a ratchet plate or disc 30 held in juxtaposed relation to the base plate 6 by an annular flange 31 on the post 7. This disc 30 is provided with an annular ring of ratchet teeth 32 formed with abrupt shoulders facing the direction of rotation of the reel 8 as the cable 9 is withdrawn therefrom. Similar ratchet teeth 33 are provided on the edge of the reel 8 adapted to engage the teeth 32 on the disc 30 when the reel 8 is moved axially on the post 7 toward the disc 30. A light coil spring 34 is disposed on the post 7 between the shoulder 35 at the reduced portion thereof and the inner central portion of the clutch chamber 28 to yieldably support the reel or winding drum 8 with its ratchet teeth 33 disengaged or spaced from the ratchet teeth 32 on the disc 30.

The disc 30 is provided with a lateral handle-like extension 36 having its outer end portion bent at right angles and connected by a coil tension spring 37 to a bell crank lever 38, carried in a bracket 39, suitably secured to the base plate 6. The ratchet disc 30 is provided with four laterally extending actuator pins 40 projecting into the space between the rolls 27 in the clutch chamber 28 of the reel 8 and the abrupt walls 24 of the spider 21.

Rotation of the ratchet disc 30 in the cable winding direction of the cable tensioning drum 8 causes these actuator pins 40 to force the camming rolls 27 toward the wider or curved ends 25 of the roll receiving openings in the spider between the arms 23, which in turn causes the rolls 27 to force the spring plunger members 29 in and render the rolls inoperative to lock the reel 8.

The tension spring 37 must have sufficient tension to hold the ratchet disc 30 in the just-referred-to release position when the bell crank lever 38, to which the spring is attached, is moved to the right, as shown in Fig. 2 of the drawings. When the bell crank lever 38 is released, the lever moves to the left, relieving the tension of the spring 37 on the arm 36 of the ratchet plate 30, permitting the plungers 29 in the spider 21 to become immediately effective to jam the rolls 27 into locking engagement with the winding reel 8, arresting rotation of the reel.

Operating means is provided for releasably holding the bell crank lever 38 in tensioning position with respect to the spring 37, this means comprising a tubular guide member 41 secured to the pilot seat or other convenient part of the craft carrying the seat, and carrying an actuating rod 42 secured to a cable 43, which, after passing through suitable guide means 44, is connected at 45 to the arm of the bell crank 38 opposite the connection to the spring 37. The tubular guide member 41 is provided with a longitudinal slot 46 adapted to receive a lateral pin 47 projecting from the actuating rod 42 when this pin is lined up with the slot. In this position, the actuating rod 42 is free to slide longitudinally in the tubular guide member 41 when the pin 47 enters the slot, permitting the bell crank to freely move to the left, relieving tension on the spring 37.

The cable 43 carries an abutment 48, having a coil spring 49 interposed between the same and the supporting part 50 of the craft, previously referred to. The spring 49 assists in moving the actuating rod 42 to its spring releasing position, and when in released position, the pilot, in order to make the harness retrieving device automatically operable upon deceleration of the plane, grasps the handle or knob 51, pulls it outwardly until the pin 47 reaches the end of the guide member 41, and, upon rotation thereof, the pin engages the extremity of the guide member 41, holding the rod withdrawn. Since the rod is connected to the bell crank, the bell crank will be secured in its spring tensioning position, as shown in the drawings.

Under these conditions, the pilot will be free to move forward or backward in his seat and the harness attached to the cable 9 coming from the reel 8 will be correspondingly withdrawn or retrieved. Should the vehicle or plane, on which the device is carried, be suddenly decelerated, the inertia, due to the weight of the reel 8, will cause the same to slide axially on the post 7, compressing the light coil spring 34 and causing the ratchet teeth 33 on the edge of the reel 8 to engage the ratchet teeth 32 on the ratchet disc 30. Simultaneously, the forward inertia of the pilot, due to his weight, will cause the harness attached to the pilot seat and forming a part of the decelerated structure, to tension the winding cable 9, tending to rotate the reel 8 and unwind the cable 9, but since the ratchet disc 30 is now interconnected by the ratchet teeth 32 to the cable drum or reel 8, the disc 30 will be also rotated, causing the actuator pins 40 to move away from the rolls 27 in the clutch chamber 28, and the spring tensioned plungers 29 will immediately force the rolls 27 into wedging engagement between the camming surfaces 26 on the fixed spider 21 and the inner annular wall of the reel, locking the reel against further unreeling action and preventing the pilot from being thrown forward and injured on the instrument panel or other structure of the plane in the event of excessive deceleration.

If desired, the pilot may, at his option, rotate the knob or handle 51, relieving the tension on the spring 37, in which event the plungers 29 will be continuously effective to cause braking or locking action on the reel 9 against any cable unreeling movement at all times, although the drum is operative to retrieve the cable and to take up slack in the pilot harness as the pilot moves backward toward the back of his chair.

Figure 5:
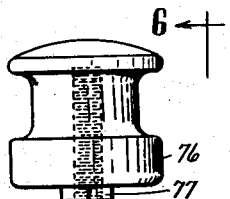
Fig. 5 is a fragmentary side elevation of a modified form of an inertia harness locking device, parts being broken away and shown in section.
Figure 6:
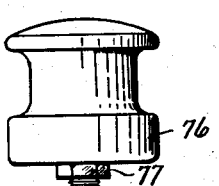
Fig. 6 is an end elevation of the inertia lock disclosed in Fig. 5, partly in section, taken on plane indicated by line 6—6 of Fig. 5.

Referring now to the modified form of the invention, as disclosed in Figs. 5 and 6, the pilot restraining harness is secured to an actuating cable or rod member 52 passing through guide bushings 53 secured on the inertia control cable locking device indicated generally at 54. This device comprises a guide block or support 55 bracketed to the back of the pilot seat in a manner similar to the inertia control takeup reel in the preferred form of the invention, and has a wedge-shaped slot 56 formed therein with a groove or channel 57 at one side of the slot to constitute a supporting surface for the cable or rod member 52. A camming roll 58 is disposed in the slot 56 having an annular knurled groove 59 around the periphery for frictionally engaging the rod or cable member 52 attached to the pilot harness. A relatively light leaf spring 60 is secured to the top of the guide block 55 and rests in a position to yieldably urge the camming roll 58 toward the wider portion of the wedge-shaped slot 56. A relatively heavy leaf spring 61 is secured to the outer end of the guide block 55 and extends laterally along the under side of the guide block toward the actuating rod 52 and is rebent on itself to enter the camming slot 56 and engage the camming roll 58 substantially opposite to the engagement of the light leaf spring 60. The heavy leaf spring 61 has sufficient tension to normally overcome the tension of the spring 60, forcing the camming roll up the inclined camming surface 62 into wedging engagement with the harness restraining cable or rod 52, and locking the same against movement.

A side plate 63 closes the opening to the wedge-shaped slot 56 and retains the camming roll 58 therein between the two springs 60 and 61, this camming plate being secured by suitable rivets 64 to the guide block support 55.

The guide block 55 is provided adjacent its outer end with a spherical socket 65 receiving a ball-shaped member 66 carried on the reduced extension 67 of the inertia operated rod member 68. The end 69 of the reduced extension 67 of the inertia operated rod member 68 engages a somewhat spherical extension 70 formed on the heavy leaf spring 61 and, when the inertia operated rod 68 is in a substantially perpendicular position or at right angles to the face of the guide block 55 the engagement of the end 69 with the spherical extension holds the heavy spring 61 in disengaged or non-operative position with respect to the camming roll 58, permitting the light spring 60 to maintain the camming roll out of wedging engagement with respect to the harness retrieving rod or cable 52. A threaded sleeve 71 is received in a threaded opening in the guide block 55 above the spherical socket 65 to engage the ball-shaped member 66 retaining the same in the socket for substantially universal movement. The threaded sleeve is provided with an enlarged annular spring seat 72 receiving one end of an equalizing spring 73 for yieldably maintaining the end 69 of the inertia rod 68 in engagement with the spherical projection 70 on the heavy spring 61. The opposite end of the spring 73 is seated in an adjustable spring seat 74 carried by the inertia rod 68 and adjustable longitudinally on the rod by the adjusting nuts 75 carried by the threaded portion of the rod. A weight member 76 is adjustably secured on the threads of the inertia rod 68 and fixed thereon by a jam nut 77. The guide bushings 63 are provided with suitable notches 78 at one side thereof to accommodate the respective camming roll engaging springs 60 and 61.

The spring 61 is preferably seated in a groove 79 extending across the end of the guide block in parallel relation to the guide rod or cable 52, and a retainer plate 80 is secured to the end of the guide block 55 to retain the spring 61 fixed in the groove 79, just referred to.

In the operation of this form of the invention, the nuts 75 may be adjusted to regulate the equalizing tension on the spring 73, maintaining the inertia rod 68 in its spring releasing position, and the weight member 76 may also be adjusted toward or away from the pivotal axis of the rod at the center of the ball-shaped member 66 so that the amount of inertia required to move the weight member with respect to the equalizing pressure of the spring 73 can be adjusted, or in other words, the device can be adjusted to operate upon an excess of a predetermined deceleration of the support carrying the device.

Resilient means is provided to normally maintain a yieldable downward pull on the rod or cable 52 to maintain the shoulder harness for the pilot in contact with the pilot's shoulders at all times and permit him to move substantially freely froward in his seat. This is accomplished by the inertia rod 68 being held in released position by the spring 73, which holds the heavy spring 61 out of engagement with the camming roll 58, and the spring 60 holding the camming roll, in turn, out of engagement with the yieldable tensioning rod 52 for the harness. Upon deceleration, the inertia of the weight 76 tilts the inertia rod around its ball-shaped pivot, swinging the lower end 69 off the spherical projection 70 carried by the spring 61, allowing the resiliency of this heavy spring to overcome the pressure of the spring 60 on the camming roll, forcing the camming roll into tight wedging or locking contact with the harness tensioning rod or cable 52 and locking this last mentioned member against any upward movement that would communicate slack to the pilot's harness, and thus effectively restrain the pilot from relative forward movement with respect to his seat in the event of a decelerating action of the seat or the support carrying the seat.

Having thus described our invention, we claim:

1. In an aircraft safety device, a pilot seat subject to a decelerating action, a resiliently tensioned cable takeup drum operatively associated with said pilot seat, having cable means wound thereon, one-way clutch means normally operable to prevent cable unwinding action of said cable drum, a pilot harness for said seat having one end portion fixedly secured with respect to said seat and the other end portion secured to said cable means to take up slack in the harness and secure a pilot when in said pilot seat against forward movement with respect to said seat upon decelerating movement of the seat, inertia operated means subject to said decelerating action normally operatively engaging said one-way clutch means to maintain the clutch means non-operative, said inertia operated means being movable to non-operative position upon said predetermined decelerating action to render said one-way clutch means operative to prevent the unwinding action of said cable drum.

2. In an inertia operated locking device for pilot harness, a support, a pilot harness tensioning reel carried by the support, resilient means yieldably tensioning said reel to rotate the same in one direction, a harness retrieving cable wound on said reel with one end secured to the reel and the other end adapted to be secured to one end of the pilot harness to cause yieldable rotation of the reel in the opposite direction upon tensioning of the cable by the harness connected thereto, means normally operable to lock said reel against rotation in the last mentioned direction, and inertia operated means subject to said decelerating action to normally hold said locking means in non-operative position and operable by inertia due to said decelerating action to release said reel locking means to render the same operative during the decelerating action.

3. In a safety device of the class described, a support having an axially shiftable cable reel rotatably mounted thereon, one-way locking means for said reel normally preventing rotation of the reel in one direction, resilient means for rotating the reel in the opposite direction, a pilot safety shoulder harness retrieving cable wound about said reel adapted to be tensioned upon rotation of the reel in the last mentioned direction, release means for said one-way locking means rotatably mounted on said support and rotatable in one direction concentric to the axis of rotation of the reel to move said locking means to non-locking position, yieldable tensioning means for rotating said release means in the last mentioned direction, and normally non-operative one-way clutch means between said reel and said release means operable by axial movement of the reel, and subsequent cable unwinding rotative movement of the reel to rotate said release means to non-operative position.

4. In a safety device of the class described, a support having an axially shiftable cable reel rotatably mounted thereon, one-way locking means for said reel normally preventing rotation of the reel in one direction, resilient means for rotating the reel in the opposite direction, a pilot safety shoulder harness retrieving cable wound about said reel adapted to be tensioned upon rotation of the reel in the last mentioned direction, release means for said one-way locking means rotatably mounted on said support and rotatable in one direction concentric to the axis of rotation of the reel to move said locking means to non-locking position, yieldable tensioning means for rotating said release means in the last mentioned direction, normally non-operative one-way clutch means between said reel and said release means operable by axial movement of the reel, and subsequent cable unwinding rotative movement of the reel to rotate said release means to non-operative position, and normally operable means for releasing said yieldable tensioning means for the rotatable release means to render said one-way locking means continuously operable to prevent cable unwinding rotative movement of said reel.

5. In a safety retrieving device for pilot harness, a support, an inertia operable cable reel mounted on the support for rotative movement, and limited axial movement toward the support due to a decelerating movement of the support in a direction axially of the reel, yieldable means for supporting the reel in spaced relation with respect to the support, said reel having a pilot seat harness retrieving cable wound thereabout to rotate the reel in one direction upon withdrawal of the harness cable from the reel, ratchet-shaped projections formed on the end portion of the reel extending toward the support and facing in the cable unwinding direction of rotation of the reel, yieldable cable reel rotating means for rotating the reel in cable winding direction to maintain a yieldable takeup tension on the pilot harness cable, yieldable one-way operating camming lock means between the reel and the support normally operable to prevent harness cable unwinding rotation of the reel, yieldably tensioned release means for said camming lock means comprising an annular member rotatably interposed between the reel and the support to have rotative movement with the axis of rotation of the reel as a center, and having ratchet-shaped projections extending thereon facing the ratchet-shaped projections on the cable reel and extending in cable winding direction of the reel and adapted to be engaged by the teeth on the cable reel upon the said axial movement of the reel due to the deceleration of the support and rotation of the reel due to unwinding of the cable from the reel, said release means having an actuating part for moving the camming lock means to release position upon rotative movement of the annular member in cable winding direction of the cable reel, and means between the support and the annular member of the release means for normally yieldably holding the said annular member in said reel camming lock releasing position.

6. In a pilot harness tensioning cable retrieving device, a support adapted to be fixed to a craft subject to a decelerating action having a fixed post thereon extending in the direction of the decelerating action, a rotatable cable reel axially slidable on said post, a stop plate at the end of the post, light spring means between the reel and the post for yieldably urging the cable reel away from the support and toward said stop plate, spring means on the post and connected to the reel for rotating the reel in one direction, a pilot harness tensioning and retrieving cable wound about said reel and tensioned incident to rotation of the reel by the spring means in the last mentioned direction, camming lock means between the reel and the post for locking said reel against rotation in the opposite direction due to withdrawal of the cable from the reel, yieldable tension means for moving said camming lock means to move the same to locking position, release means for moving said camming lock means to non-locking position, comprising an annular member rotatably mounted on said post between the support and the reel having a part engageable with said camming lock means operable upon rotative movement of the annular member in cable winding direction of the reel to move the camming lock means to non-locking position, and releasable spring means between the annular member and the support for rotating said camming lock means in said cable winding direction of the reel, said reel and annular member having normally disengaged complemental one-way engaging means movable into engagement upon axial movement of the reel due to the aforesaid decelerating action to establish a driving engagement between the reel and annular member upon rotation of the reel in cable unwinding direction to cause rotation of the annular member to release position to render the reel camming lock means operative during the decelerating action to prevent cable unwinding rotation of the reel.

7. In a safety device of the class described for pilot seats subject to deceleration, having a pilot harness and harness retrieving means for yieldably tensioning the harness toward the seat, a support adapted to be fixedly associated with said seat, normally operable locking means engageable with said retrieving means to prevent yielding movement thereof, and inertia operable means normally engaging said locking means to hold the latter means in non-operative position, movable to nonoperative position with respect to said locking means during said deceleration.

8. In an inertia operated safety locking device for pilot shoulder harness retrieving apparatus subject to a decelerating action, said apparatus including a longitudinally movable connection connected at one end to the shoulder harness and at the other end to a yieldably tensioned harness retrieving and slacking means, said device comprising a support, a one-way acting locking means carried thereby, adapted to receive said longitudinally movable connection, and normally operable to lock said movable connection against harness slacking movement, inertia operated lever means carried by said support adapted to be subjected to said decelerating action having spring means for yieldably stabilizing relative movement of the lever means and means on said lever means for holding said one-way acting locking means in non-operative position when said lever means is in said stabilized position.

9. In an inertia operated safety locking attachment for pilot seat shoulder harness retrieving apparatus having a support subject to a decelerating action, a pilot seat having a shoulder harness adapted to engage the shoulders of a pilot while in said seat, said harness being connected at one end to the seat and connected at the other end to a yieldably tensioned harness retrieving device by an axially movable operating connection located below the top of the seat, said attachment comprising a guide bracket member adapted to be secured to the rear of the pilot seat and formed with a downwardly tapering camming slot therein to receive the operating connection aforesaid, one side of said slot being disposed in substantially juxtaposed parallel relation to the direction of movement of the operating connection when disposed in the slot, and the opposite side of the slot being inclined downwardly away from the first mentioned side of the slot, a camming roll disposed in said slot and movable into camming engagement with the said downwardly tapering side of the slot and with the operating connection at the other side of the slot when disposed therein, relatively light spring actuating means carried by said guide bracket engaging said camming roll yieldably urging the same downwardly toward the wider portion of the camming slot to disengage the roll from the operating connection, relatively heavy spring actuating means carried by said guide bracket and normally operable to engage said camming roll opposite to the engagement of the relatively light spring actuating means to overcome the tension of the light spring actuating means and move the camming roll into camming engagement with the operating connection when the same is disposed in the camming slot, an inertia operated lever member pivoted to said guide bracket member to move in a plane substantially parallel to the direction of the decelerating action of the support and extending at substantially right angles to the said direction of the decelerating action of the support, said lever constituting inertia operated means releasably engaging said relatively heavy spring means to support the same in non-operative position with respect to said camming roll, stabilizing spring means between the lever and said guide bracket for yieldably holding said inertia operated lever in said relatively heavy spring engaging position, and a weight member on the lever member adapted to be subjected to said decelerating action to cause movement of said lever to disengaging position with respect to said relatively heavy spring means to render said heavy spring means operative to overcome the opposing tension of the said light spring means and move said camming roll to wedging position to lock the operating connection against upward harness slacking movement when the same is disposed in said camming slot.

WILLIAM A. GEOHEGAN.
RAYMOND E. PHIPPS.